(12) United States Patent
Takahashi

(10) Patent No.: US 7,865,023 B2
(45) Date of Patent: Jan. 4, 2011

(54) DIGITAL STILL CAMERA

(75) Inventor: Kazuhiro Takahashi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 930 days.

(21) Appl. No.: 11/657,563

(22) Filed: Jan. 25, 2007

(65) Prior Publication Data

US 2007/0177809 A1 Aug. 2, 2007

(30) Foreign Application Priority Data

Jan. 31, 2006 (JP) ............................. 2006-022441

(51) Int. Cl.
G06K 9/36 (2006.01)
G06K 9/46 (2006.01)

(52) U.S. Cl. .................................................. 382/232

(58) Field of Classification Search ................ 382/232, 382/233, 236, 239, 250, 251; 348/390.1, 348/E5.099, E7.086; 375/240.03, 240.12, 375/240.16, 240.26; 386/95, 103, 112, 120, 386/E5.072; 358/538, 539; 709/231
See application file for complete search history.

(56) References Cited

U.S. PATENT DOCUMENTS

| | | | | |
|---|---|---|---|---|
| 5,491,481 A * | 2/1996 | Akagiri | ....................... | 341/87 |
| 5,619,732 A * | 4/1997 | Yoneyama | ................... | 710/58 |
| 5,875,304 A * | 2/1999 | Winter et al. | ............... | 709/231 |
| 5,953,484 A * | 9/1999 | Kojima | ........................ | 386/68 |
| 6,141,492 A * | 10/2000 | Hori | .......................... | 386/112 |
| 6,167,085 A | 12/2000 | Saunders et al. | | |
| 6,847,681 B2 * | 1/2005 | Saunders et al. | ....... | 375/240.03 |
| 7,194,140 B2 | 3/2007 | Ito et al. | | |
| 7,526,135 B2 * | 4/2009 | Iinuma et al. | ............... | 382/232 |
| 7,650,058 B1 * | 1/2010 | Garoutte | ..................... | 386/95 |
| 2003/0118240 A1 * | 6/2003 | Satoh et al. | ................ | 382/239 |
| 2004/0156551 A1 * | 8/2004 | Nishiyama | .................. | 382/239 |
| 2007/0177809 A1 * | 8/2007 | Takahashi | .................. | 382/232 |

FOREIGN PATENT DOCUMENTS

| | | |
|---|---|---|
| JP | A 2001-169280 | 6/2001 |
| JP | A-2003-209698 | 7/2003 |
| JP | A 2004-56680 | 2/2004 |
| JP | A-2004-215156 | 7/2004 |

OTHER PUBLICATIONS

Oct. 19, 2010 Notification of Reasons for Refusal issued in corresponding Japanese Patent Application No. 2006-022441 (with translation).

* cited by examiner

*Primary Examiner*—Amir Alavi
(74) *Attorney, Agent, or Firm*—Oliff & Berridge, PLC

(57) ABSTRACT

There is provided a digital still camera which is capable of performing fixed-length compression to image data at high speed while suppressing dispersion in size of compressed data by including; a first compression unit which compresses inputted image data using a predetermined first compression parameter, a second compression unit which compresses the inputted image data using a second compression parameter different from the first compression parameter, an evaluating unit which evaluates compression results of the first compression unit and of the second compression unit based on a relationship with a predetermined range including a target size of compressed data, and a selecting unit which selectively performs recording processing to a compression result highly evaluated by the evaluating unit.

5 Claims, 6 Drawing Sheets

DIGITAL STILL CAMERA

CROSS REFERENCE TO RELATED APPLICATION

This application is based upon and claims the benefit of priority from Japanese Patent Application No. 2006-022441, filed on Jan. 31, 2006, the entire contents of which are incorporated herein by reference.

BACKGROUND OF THE INVENTION

1. Field of the Invention

The present invention relates to a digital still camera which records image data representing a photographed image after compressing the image data.

2. Description of the Related Art

In a digital still camera, in many cases, a target file size for recording image data is determined in advance according to image quality setting of the user (for example, FINE for high resolution, NORMAL for standard resolution, BASIC for basic resolution).

In such a digital still camera, image data obtained by photographing is compressed so that the amount of image data falls within a tolerable range of the target file size corresponding to the image quality setting, by repeating test compression to the photographed image data while changing a compression parameter to find an optimum compression parameter.

This is because in the JPEG format, widely used for compression processing to still images of digital still cameras, the size of compressed data changes significantly depending on characteristics of a captured scene. Therefore, in order to make the size of compressed data of image data from various scenes to fall within a predetermined range, it is necessary to adjust the level of compression by adopting an appropriate quantization parameter for individual image data.

Such adjustment of a compression ratio is performed by adjusting the quantization parameter with a scale factor SF, thereby realizing the compressed data having a fixed length, the quantization parameter being used when coding image data according to the JPEG format.

In a conventional general fixed-length compression processing technology, pre-compression are performed two or three times while changing the scale factor to estimate an optimum scale factor based on size variation of the compressed data obtained at this time, thereby adopting the estimated optimum value for the scale factor to obtain final compressed data (refer to Japanese Unexamined Patent Application Publication No. 2001-169280).

Also, there is a proposed method in which a model regarding size variation of compressed data corresponding to variation in value of scale factor is used to obtain the optimum value of the scale factor based on a result of a single pre-compression (refer to Japanese Unexamined Patent Application Publication No. 2004-56680).

Thus, when a compressed image is recorded in the storage medium such as a flash card by substantially fixing the length of compressed data, the expected number of images corresponding to the image quality is assured as the number of images to be recorded in a storage medium.

Further, the amount of compressed data recordable in a single storage medium has been increasing along with continuous massive increase in capacity of the storage media adopted for digital still cameras. Thus, when not so significant size variation in individual compressed data is averaged in the process of recording a large amount of compressed data in the same storage medium it is highly expectable that an amount of compressed data calculated from image quality setting is recorded.

However, along with recent significant increase in number of pixels to address demands for enhanced image quality, speeding up of image processing and image data compression by increasing the speed of hardware has reached a limitation since loads on an image processing unit and a data compression unit incorporated in digital cameras are on the increase. This is because the power consumption increases when the clock frequency of an image processing LSI is raised for increasing the processing speed, which drains the battery quickly and hinders assurance of sufficient operation time. Further, increasing the clock frequency has a limit, and increasing the speed of image processing and image compression processing that can be achieved by simply operating the hardware at high speed also has a limit.

However, if it takes longer to perform image processing and image compression processing as the number of pixels increases, then it is not fulfilling demands from users.

Following such tendencies, a technology of increasing the speed of fixed-length compression processing while allowing dispersion in size of individual image data to a certain extent is needed in order to respond to demands from a wide range of users, rather than a technology of making the size of individual compressed data to have a fixed length with quite high precision.

SUMMARY OF THE INVENTION

An object of the present invention is to provide a digital still camera capable of performing fixed-length compression of image data at high speed while suppressing dispersion in size of compressed data.

Further, another object of the present invention is to reliably assure recording in a medium of compressed data corresponding to a number of images that is defined corresponding to image quality setting, by averaging dispersion in size of compressed data in the process of photographing a large number of images by making the size of respective compressed data to fall within a tolerable range.

Other objects of the present invention are to completely prevent a problem such that a part of compressed data corresponding to images obtained by continuous shooting is not recorded in a medium and to achieve a quite short photographing interval.

The above-stated objects are achieved by a first digital still camera constructed as follows.

In a digital still camera which compresses image data for recording, the image data representing a digital still image photographed by a photographing unit, a first compression unit compresses inputted image data, using a predetermined first compression parameter. A second compression unit compresses the inputted image data, using a second compression parameter different from the first compression parameter. An evaluating unit evaluates compression results of the first compression unit and of the second compression unit based on a relationship between the compression results and a predetermined range including a target size of compressed data. A selecting unit selectively performs recording processing to a compression result highly evaluated by the evaluating unit.

In such a digital still camera, it is possible to perform fixed-length compression to image data at quite high speed while suppressing dispersion in size of compressed data by selecting one of compressed data obtained in parallel by the two compression units.

Further, the above-stated objects are achieved by a second digital still camera constructed as follows.

In the above-described first digital still camera, the first compression unit performs compression processing to image data obtained by the photographing unit, using a standard compression parameter with which image data of a standard image having a standard amount of information is compressed to obtain compressed data of the target size. Further, the second compression unit performs compression to image data obtained by the photographing unit, using a compression parameter corresponding to a predetermined auxiliary scale factor, which is equal to or larger than a standard scale factor corresponding to the standard compression parameter and smaller than a maximum scale factor which corresponds to a compression parameter with which the standard image is compressed to obtain compressed data of a size corresponding to a lower limit of a predetermined range including the target size.

In this manner, one of the compression units performs compression processing using a standard compression parameter which is suitable for a scene to be photographed that is estimated from photographing mode setting, a photometric result, and the like. And the other one of the compression units performs compression processing using a different compression parameter determined considering a tendency of image data corresponding to the above-described scene to be photographed. Thus, it can be substantially assured that the size of compressed data obtained by at least one of these compression units falls within a predetermined range including a target size.

Further, the above-stated objects are achieved by a third digital still camera constructed as follows.

In the above-described first digital still camera, the first compression unit performs compression processing to image data obtained by the photographing unit, using a plain compression parameter with which image data of a typical plain image with an amount of information smaller than the standard image is compressed to obtain compressed data of the target size. The second compression unit performs compression to image data obtained by the photographing unit, using an upper limit compression parameter with which the typical plain image is compressed to obtain compression data of a size corresponding to a lower limit in a predetermined range including the target size.

Further, the above-described objects are achieved by a fourth digital still camera constructed as follows.

In the above-described first digital still camera, the first compression unit performs compression processing to image data obtained by the photographing unit, using a compression parameter for complicated images with which image data of a typical complicated image with an amount of information larger than the standard image is compressed to obtain compressed data of the target size. The second compression unit performs compression to image data obtained by the photographing unit, using a lower limit compression parameter with which the image data of typical complicated image is compressed to obtain compression data of a size corresponding to an upper limit of a predetermined range including the target size.

Further, the above-stated objects are achieved by a fifth digital still camera constructed as follows.

In the above-described first digital still camera, a parameter calculating unit calculates, in response to a mode setting instruction a first compression parameter to be used in the first compression unit for image data of a current frame, based on a compression parameter for compressed data of a previous frame selected by the selecting unit and on a size of the selected compressed data and the target size, and provides the first compression parameter to the first compression unit for the compression processing, the mode setting instruction indicating a continuous shooting mode in which images are shot continuously by the photographing unit. A parameter determining unit determines a value of second compression parameter based on the first compression parameter calculated by the parameter calculating unit, and provides the second compression parameter to the second compression unit for the compression processing.

Further, the above-stated objects are achieved by a sixth digital still camera constructed as follows.

In the selecting unit provided in the above-described first digital still camera, two memories store therein compressed data obtained by the first compression unit and the second compression unit, respectively. A purging unit purges compressed data evaluated low by the evaluating unit, out of two compressed data of an image of a current frame, the compressed data being written in parallel to the two memories. An assigning unit assigns one of the memories storing the compressed data purged by the purging unit, as a storage of compressed data of a next frame to be generated by one of the compression units which has generated compressed data of the current frame highly evaluated by the evaluating unit.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be described in detail based on the drawings.

First Embodiment

Figure 1:
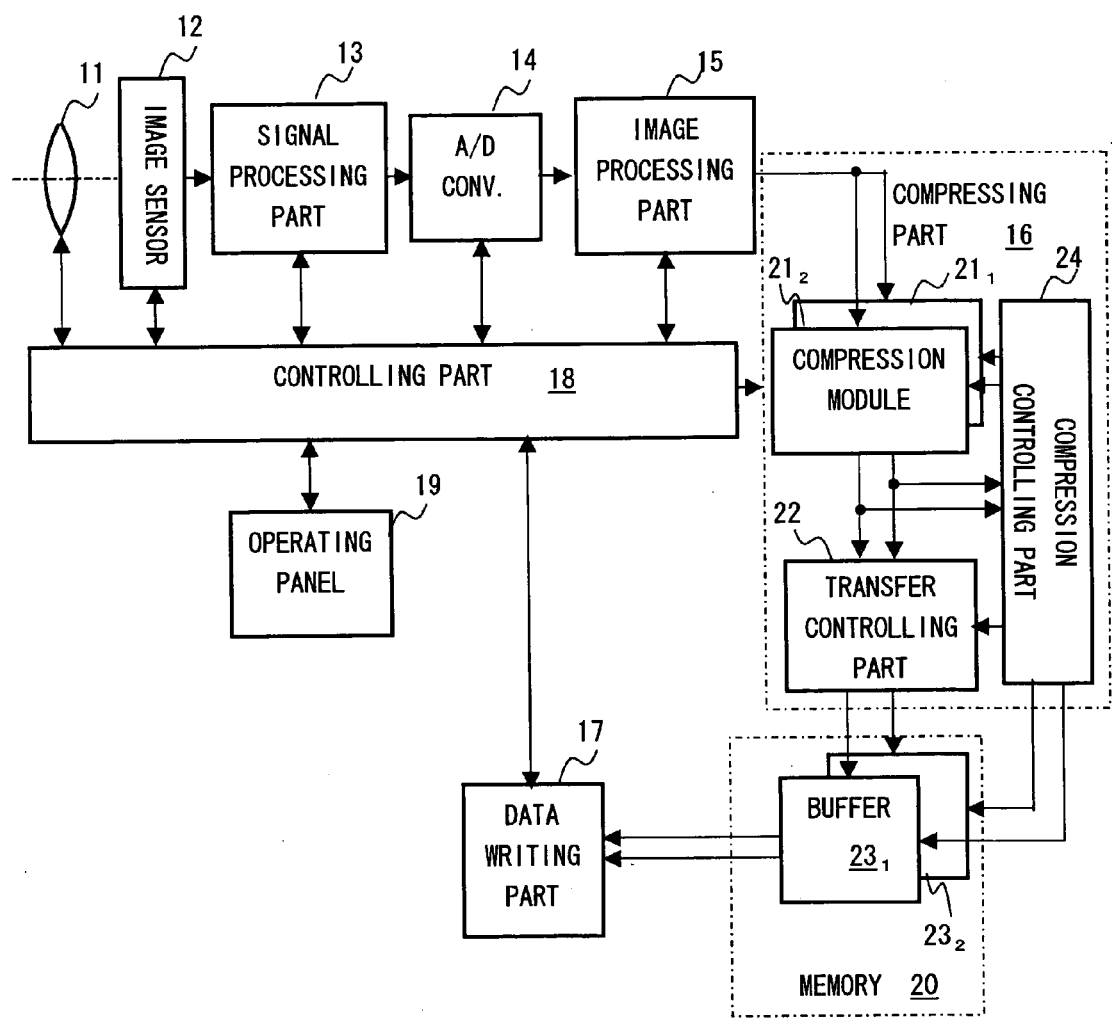
FIG. 1 is a view showing a first embodiment of a digital still camera according to the present invention.

FIG. 1 shows a first embodiment of a digital still camera according to the present invention.

In the digital still camera shown in FIG. 1, an image formed on an image sensor 12 by a photographic optical system 11 is converted by this image sensor 12 into an electrical signal, and then converted into image data representing a digital still image by processing in a signal processing part 13 and an A/D converter 14. After being subjected to image processing by an image processing part 15, the image data obtained in this manner is passed to an image data compressing part 16 via a memory 20, and compressed to a size corresponding to image quality setting by this image data compressing part 16 and recorded in a storage medium such as a memory card via a data writing part 17.

According to an instruction inputted by a user via an operating panel 19 shown in FIG. 1, a controlling part 18 performs controlling of operations of the above-described respective parts. For example, information related to photographing conditions and information indicating image quality (FINE, NORMAL, BASIC, or the like) set by operating buttons provided on the operating panel 19 are passed to the image data compressing part 16 via the controlling part 18, and according to these information, the image data compressing part 16 performs fixed-length compression, which will be described later, on the basis of a target size set in advance according to the received image quality setting information.

Further, in FIG. 1, the image data passed from the image processing part 15 are compressed by two compression modules 21$_1$, 21$_2$ provided in the image data compressing part 16 using compression parameters which are different from each other, and obtained two compressed data are stored by a transfer controlling part 22 in two buffers 23$_1$, 23$_2$ provided in the memory 20.

In this image data compressing part 16, a compression controlling part 24 controls operations of the transfer controlling part 22 and the compression module 21 based on an instruction from the controlling part 18 and results of evaluation processing (described later) regarding the compressed data obtained by the above-described two compression modules 21$_1$, 21$_2$.

Figure 2:
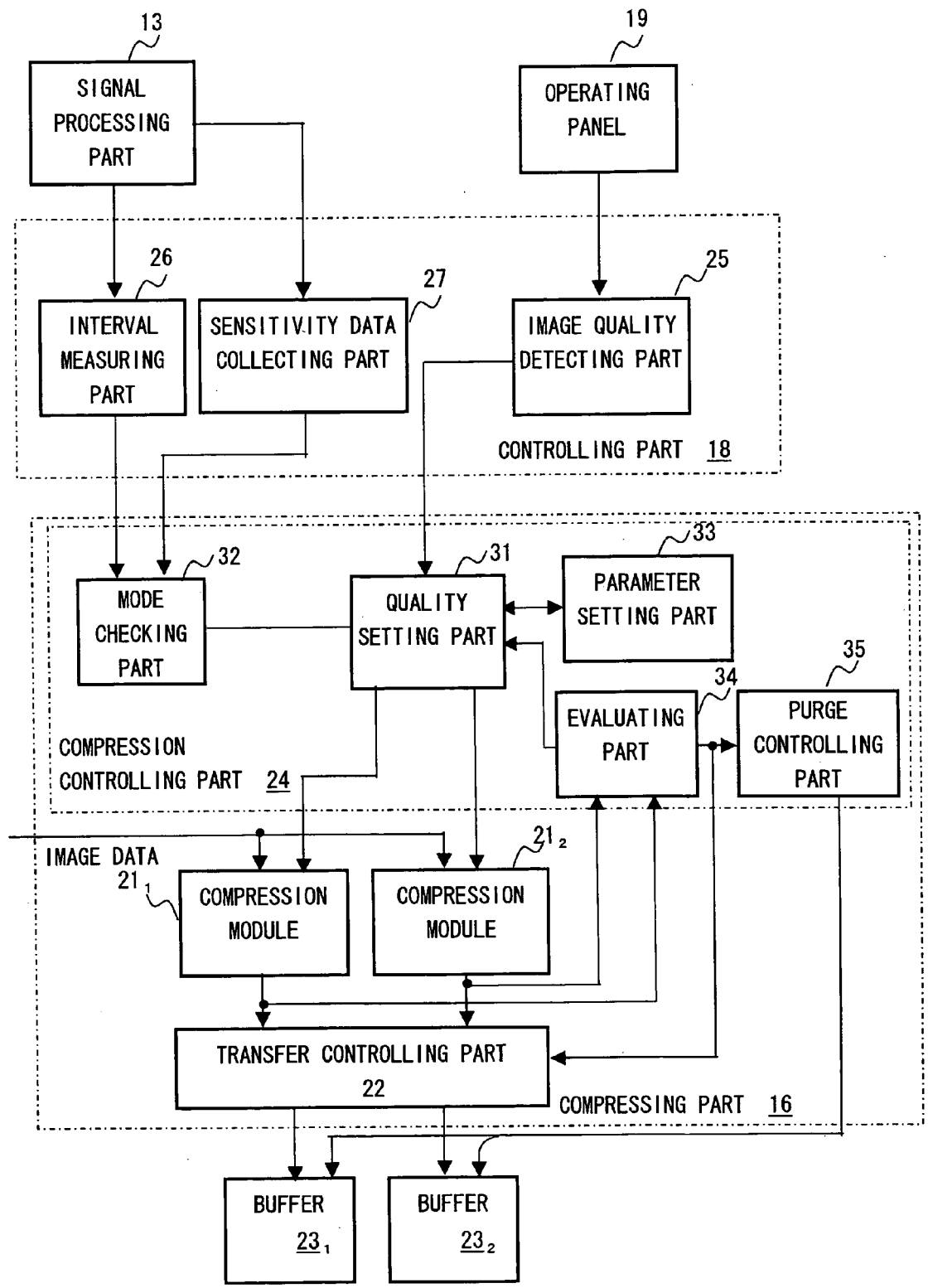
FIG. 2 is a view showing a detailed structure of an image data compressing part.

FIG. 2 shows a detailed structure of the image data compressing part 16.

In FIG. 2, image quality setting information inputted by operating the operating panel 19 are detected by an image quality detecting part 25 provided in the controlling part 18, and passed to the compression controlling part 24 provided in the image data compressing part 16, and the target size is determined according to the information. Further, by an interval measuring part 26 provided in the controlling part 18 shown in FIG. 2, an interval of obtaining image data is measured based on, for example, information regarding the time when individual image data collected from the signal processing part 13 are obtained, and a measurement result thereof is also passed to the compression controlling part 24. Furthermore, information indicating sensitivity related to individual photographing collected from the signal processing part 13 and the like are passed to the above-described compression controlling part 24 via a sensitivity data collecting part 27 shown in FIG. 2.

In the compression controlling part 24 shown in FIG. 2, a quality setting part 31 controls a calculating operation of scale factors by a parameter setting part 33 based on image quality setting information notified from the above-described image quality detecting part 25, checking results from a mode checking part 32 and evaluation results from an evaluating part 34 which will be described later, and sets two scale factors SF1, SF2 obtained by the parameter setting part 33 to the two compression modules 21$_1$, 21$_2$, respectively. Further, in this compression controlling part 24, the evaluating part 34 evaluates the compressed data obtained by the above-described two compression modules 21$_1$, 21$_2$ based on results of comparing sizes of the compressed data and the target size, and passes evaluation results to the transfer controlling part 22, a purge controlling part 35 and the quality setting part 31, thereby providing the evaluation results to these respective parts for processing. The purge controlling part 35 shown in FIG. 2 purges compressed data which is evaluated low in the buffer 23$_1$ or buffer 23$_2$ based on the evaluation results received from the evaluating part 34, and releases the storage area in which the purged compressed data is stored.

Further, by the mode checking part 32 shown in FIG. 2, based on information related to photographing conditions inputted from the above-described controlling part 18, newly inputted image data is judged as to whether or not it is image data to which compression processing of a continuous shooting mode, which will be described later, is applicable, and a judgment result is passed to the quality setting part 31.

Hereinafter, operations of the image data compressing part 16 constructed as such will be described in detail.

Figure 3:
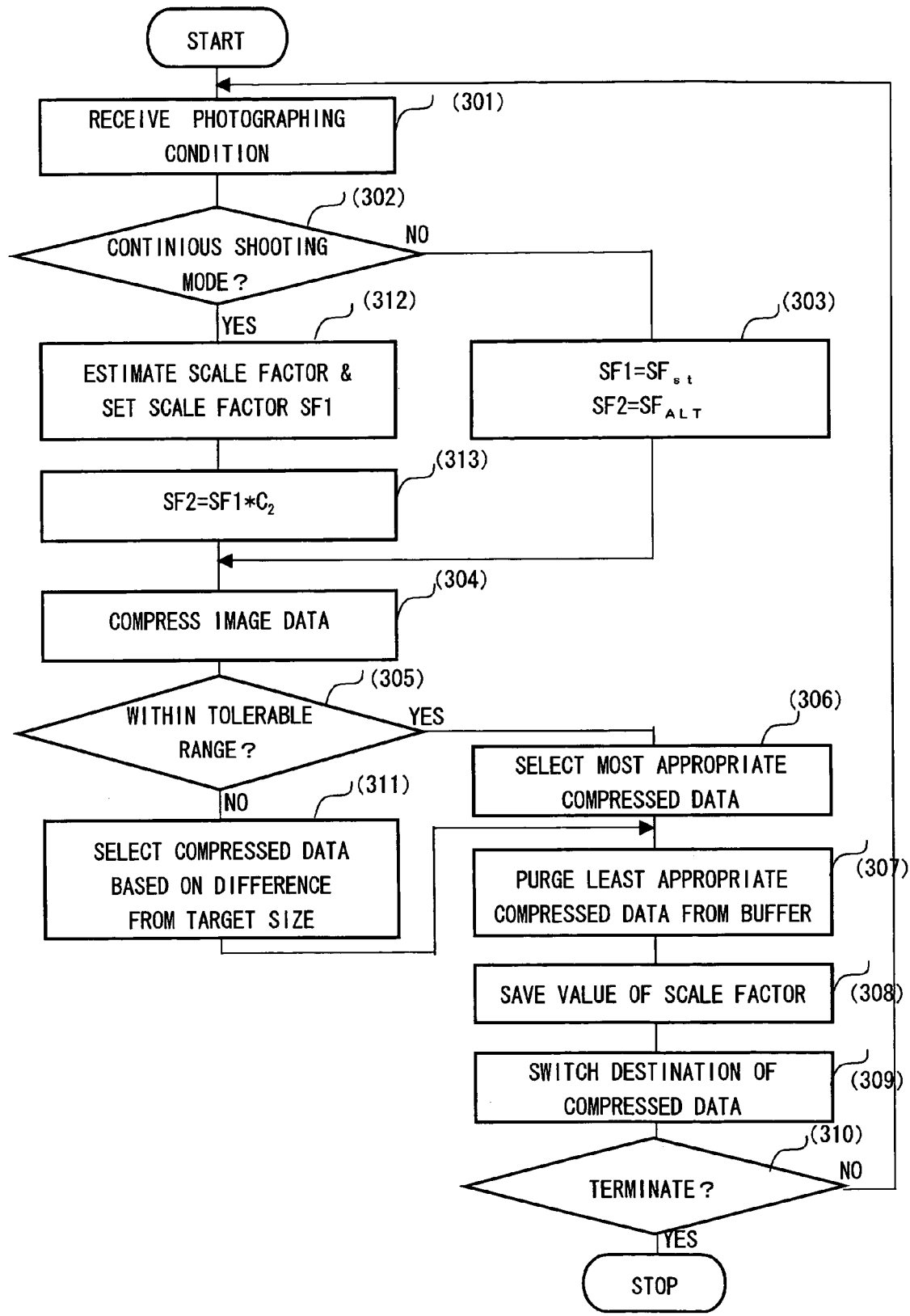
FIG. 3 is a flowchart representing an operation of the image data compressing part.

FIG. 3 shows a flowchart representing an operation of the image data compressing part 16. Further, FIGS. 4A to 4C show views explaining an operation of managing compressed data.

First, the image data compressing part 16 receives information regarding photographing conditions (for example, interval and sensitivity) from the controlling part 18 shown in the drawings. Based on the information, the mode checking part 32 judges whether or not the target image data is to be compressed in a continuous shooting mode (steps 301, 302 in FIG. 3). At this time, for example, the mode checking part 32 shown in FIG. 2 judges for interval D whether or not the interval D is equal to or lower than a predetermined threshold value Dth, and judges for sensitivity V whether or not a difference between sensitivity $V_{old}$ of a previous frame and sensitivity V of a current frame is equal to or lower than predetermined sensitivity $V_{th}$ or not, and when both the conditions are satisfied, the mode checking part 32 judges that the continuous shooting mode should be applied. Accordingly, the continuous shooting mode can be applied only when high similarity can be expected between the image of the previous frame and the image of the current frame.

For example, in a frame photographed for the first time since the digital still camera is turned on, neither of the above-described condition regarding the interval and the condition regarding the sensitivity is satisfied, so that a judgment indicating that the continuous mode is not to be applied is passed to the quality setting part 31 by the mode checking part 32 (negative judgment in step 302 of FIG. 3). Accordingly, the image data compressing part 16 shown in FIG. 2 judges that image data of the current frame should be compressed individually, and then sets a standard scale factor $SF_{st}$, which is determined in advance for the case of independently compressing individual image data (hereinafter referred to as compression of individual mode), as the scale factor SF1 to be applied in the compression module 21$_1$ and meanwhile sets for example an auxiliary scale factor $SF_{ALT}$, which is determined in advance based on the above-described standard scale factor $SF_{st}$, as the SF2 for the compression module 21$_2$ (step 303 in FIG. 3). Note that the above-described auxiliary scale factor $SF_{ALT}$ can be obtained for example by multiplying the standard scale factor $SF_{st}$ by a predetermined coefficient $C_1$, and then limiting a value thereof by an upper limit value (or a lower limit value) for the scale factor.

Figure 4:
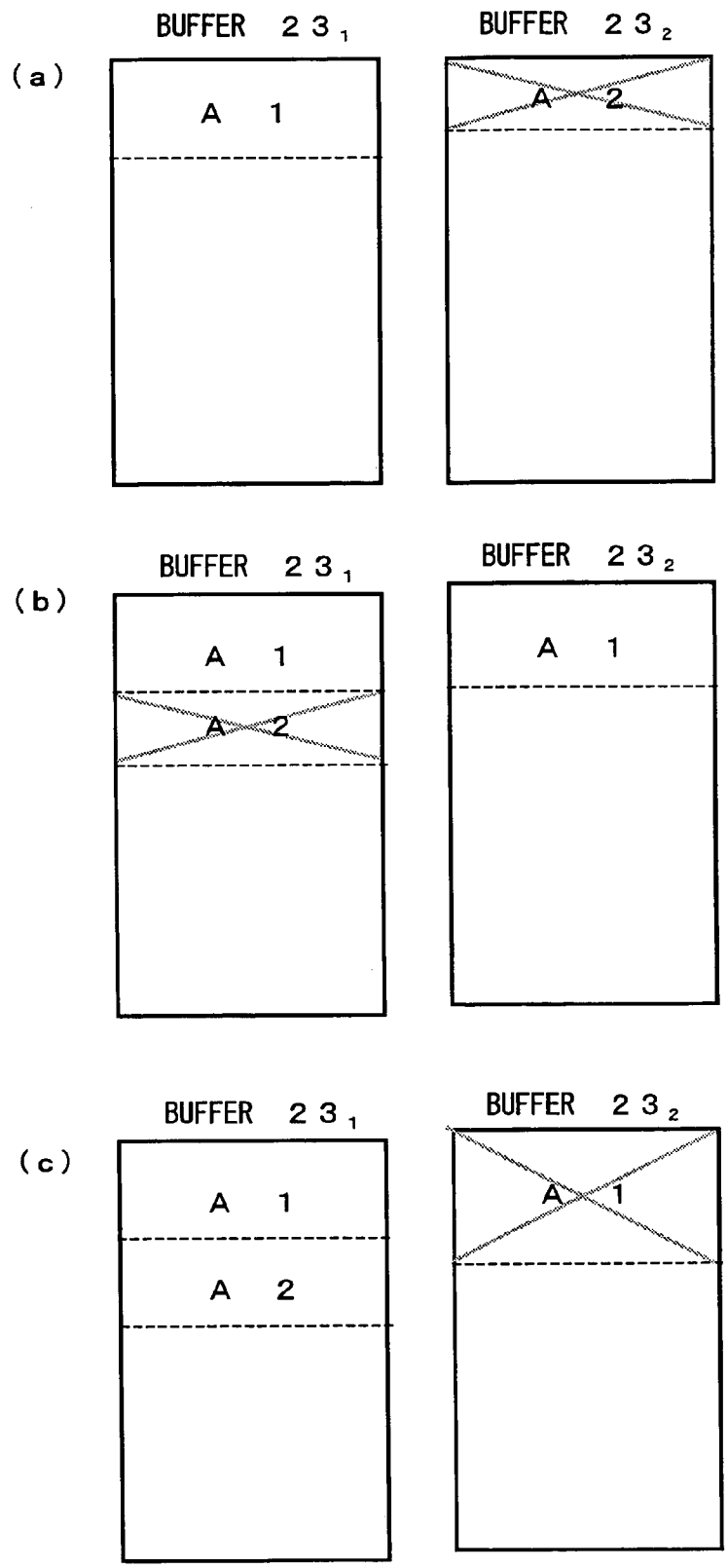
FIGS. 4A to 4C are views explaining an operation of managing compressed data.

Using the scale factors set in this manner, the compression modules 21$_1$, 21$_2$ shown in FIG. 2 perform compression processing of the image data (step 304 in FIG. 3), and obtained two compressed data are passed to the memory 20 via the transfer controlling part 22 and, as shown in FIG. 4A, stored in the two buffers 23$_1$, 23$_2$, respectively. Note that in the example shown in FIG. 4A, compressed data A1(1), A2(1) obtained using the scale factors SF1, SF2 respectively to the image data of a first frame are stored in the buffers 23$_1$, 23$_2$ respectively.

Next, the evaluating part 34 shown in FIG. 2 judges whether or not sizes S1, S2 of the compressed data A1(1), A2(1) obtained respectively by these compression modules $21_1$, $21_2$ are within a tolerable range set for a target size Ts corresponding to the image quality (step 305 in FIG. 3).

At this time, the evaluating part 34 shown in FIG. 2 compares a lower limit value $S_{min}$ and an upper limit value $S_{max}$ for the sizes of compressed data set in advance based on the target size Ts with the sizes S1, S2 of the two compressed data respectively, thereby evaluating appropriateness of these compressed data as a result of fixed-length compression processing. For example, when at least one of the sizes S1, S2 is within the tolerable range indicated by the upper limit value $S_{max}$ and the lower limit value $S_{min}$, an evaluation result indicating as affirmative judgment in step 305 that the relevant compressed data should be selected as appropriate compressed data is informed to the quality setting part 31, the transfer controlling part 22 and the purge controlling part 35 (step 306 in FIG. 3). Note that when both the sizes S1, S2 of the compressed data obtained by the above-described two compression modules $21_1$, $21_2$ are within the tolerable range, the evaluating part 34 can notify as an evaluation result that the compressed data which has obtained a size closer to the target size Ts is the most appropriate one. Further, since the scale factor SF1 applied in the compression module $21_1$ is the standard value, it is also possible to give high evaluation by priority to the compressed data obtained by the compression module $21_1$ in such a case.

For example, according to the evaluation result indicating that the compressed data A1(1) shown in FIG. 4A is the most appropriate data as the result of fixed-length compression, the purge controlling part 35 purges the compressed data A2(1), which was not selected, from the buffer $23_2$ where this compressed data is stored, thereby releasing the storage area of the buffer $23_2$ allocated for storage of this compressed data A2(1) (step 307 in FIG. 3).

Further, in response to the notification of the above-described evaluation result, the quality setting part 31 shown in FIG. 2 saves the scale factor and the size (SF1, S1 respectively in the example shown in FIGS. 4A to 4C) of compressed data corresponding to the selected compressed data as the scale factor SF(old) and the size S(old) of the previous frame (step 308 in FIG. 3). Further, at this time, in response to the notification of the above-described evaluation result, the transfer controlling part 22 shown in FIG. 2 switches the destination of transfer from the two compression modules $21_1$, $21_2$ so that compressed data to be obtained in the next frame by the compression modules $21_1$, $21_2$, from which selected compressed data is obtained as a result of fixed-length compression, is stored in the buffer in which the storage area is released in step 307 of FIG. 3 (the buffer $23_2$ in the example shown in FIGS. 4A to 4C) (step 309).

Here, it is possible to estimate with high precision a value of the standard scale factor $SF_{st}$, which should be applied for compressing image data having a standard amount of information to the target size, from accumulation of experimental results of performing compression processing using various scale factors to image data obtained by photographing various scenes. By using the standard scale factor $SF_{st}$ with the value estimated in this manner as the scale factor SF1 applied in the compression module $21_1$, it is possible to obtain with this compression module $21_1$ compressed data that is appropriate as the result of fixed-length compression with quite high percentage. Further, when a standard photographing mode is set from the above-described experimental results, in the case that compressed data having a size within the tolerable range cannot be obtained even when the above-described standard scale factor $SF_{st}$ is applied, it is known that the amount of information in image data as the compression target is larger than the standard image with high possibility. Considering this point, by setting the auxiliary scale factor $SF_{ALT}$ having a larger value than the above-described standard scale factor $SF_{st}$ as the scale factor SF2 applied to the compression module $21_2$, compressed data having a size within the tolerable range including the target size can be almost surely obtained by single compression processing performed in parallel by the compression modules $21_1$, $21_2$.

In this manner, in the image data compressing part 16 shown in FIG. 2, compressed data that is appropriate as the result of fixed-length compression can be almost surely obtained very quickly by appropriately setting values of the scale factors SF1, SF2 applied in the two compression modules $21_1$, $21_2$ and operating these compression modules $21_1$, $21_2$ in parallel.

On the other hand, when neither of the compressed data A1, A2 obtained by the two compression modules $21_1$, $21_2$ is within the above-described tolerable range (negative judgment in step S305), the evaluating part 34 obtains differences between the sizes S1, S2 of the compressed data A1, A2 and the target size Ts, and then an evaluation result, which indicates that the compression data which gives a smaller differential value is selected as a compression result that is more appropriate as the result of fixed-length compression, is notified to the quality setting part 31, the purge controlling part 35 and the transfer controlling part 22 (step 311). In response thereto, processing from the above-described step 307 to step 309 is performed.

Since probability of adopting compressed data having a size that is out of the tolerable range in this manner is very small, it can be absorbed by dispersion in sizes of numerous compressed data which can be recorded in the storage medium.

Thus, in the digital still camera according to the present invention, it is possible to achieve a significant increase in speed of fixed-length compression processing, by eliminating optimization processing of a scale factor by means of repeated pre-compression so as to limit the processing for realizing a fixed-length to the extent of suppressing dispersion in size of a large part of compressed data.

Thereafter, unless termination of photographing is instructed via the controlling part 18, the quality setting part 31 returns to step 301 as negative judgment in step 310 to receive information about photographing conditions corresponding to a new frame, and starts compression processing on this frame.

Based on the information received corresponding to the new frame, when the mode checking part 32 obtains a judgment result indicating that the continuous shooting mode should be applied (affirmative judgment in step 302), the parameter setting part 33 performs, in response to instruction from the quality setting part 31, processing of estimating a value of the scale factor SF1 to be applied in the compression module $21_1$ (step 312).

At this time, the parameter setting part 33 uses first the scale factor SF(old) and the size S(old) which are saved in step 308 of compression processing of the previous frame, the target size Ts, and an appropriately determined coefficient a, so as to calculate the scale factor SF1 to be applied in the compression module $21_1$ to the current frame represented as shown by equation (1).

$$SF1 = (S(\text{old})/Ts)^{(-1/a)} \cdot SF(\text{old}) \tag{1}$$

Here, the above-described value of coefficient a is determined by, for example, calculating the average value of parameters showing a relationship obtained about various images, based on a relationship obtained regarding the scale factor and the size of compressed data, by statistically analyzing information accumulated in advance regarding images having various characteristics, and is submitted to processing of calculating the scale factor SF1.

Next, the parameter setting part 33 multiplies the SF1 corresponding to the compression module $21_1$ obtained as described above by an appropriate coefficient $C_2$ to thereby calculate the scale factor SF2 corresponding to the compression module $21_2$ (step 312). Note that in this step 312, a predetermined constant k can be added to the above-described scale factor SF1 so as to calculate the scale factor SF2 to be applied in the compression module $21_2$, or the value of this scale factor SF2 can be limited to an upper limit value $SF_{max}$ (or to a lower limit value $SF_{min}$) regarding the above-described scale factor SF.

In this manner, in the continuous shooting mode, the two compression modules $21_1$, $21_2$ perform compression processing using the scale factors SF1, SF2 respectively, which are determined with a deviation between the compression result used for the previous frame and the target size taken into consideration. Thereby it is made possible to improve the precision of the size of compressed data due to fixed-length compression, using similarity of images of continuously photographed frames, and it is possible to cope with variation in amount of information of image data owing to scenic changes in continuously shot frames.

Further, in step 309 of compression processing for the image data of the previous frame, since the destination of transfer is switched according to the evaluation result regarding the two compressed data, when for example the compressed data A1(1) of the first frame is selected and the compressed data A2(1) is purged as shown in FIG. 4A, the compressed data A1(2) obtained by the compression module $21_1$ is stored in the buffer $23_2$ in the subsequent second frame, and instead, compressed data A2(2) obtained by the compression module $21_2$ is stored in the buffer $23_1$, as shown in FIG. 4B.

Here, as described above, since the scale factor SF1 applied in the compression module $21_1$ is defined to be suitable for the standard image data, regardless of whether the continuous mode is applied or not, there is high probability for the compressed data obtained by the compression module $21_1$ to be determined as appropriate and thus adopted as the result of fixed-length compression. In particular, in the continuous shooting mode, since the value of the scale factor SF1 to be set in the compression module $21_1$ is determined based on the compression result of the previous frame as described above, compressed data obtained by this compression module $21_1$ is selected continuously unless a large change occurs in continuously photographed scenes, and as a result, compressed data from the compression module $21_1$ is written alternately in the two buffers $23_1$, $23_2$. Therefore, storage areas of these two buffers $23_1$, $23_2$ can be used quite efficiently.

On the other hand, when the image data of the newly photographed second frame is quite different from the standard image, it is possible that, rather than the compressed data A1(2) obtained by the compression module $21_1$, the compressed data A2(2) obtained by the compression module $21_2$ is judged to be appropriate as the result of fixed-length compression, as shown in FIG. 4C. In this case, the compressed data A1(2) stored in the buffer $23_2$ is purged, and in the next frame, compressed data from the compression module $21_1$ is written in this buffer $23_2$, but there is no difference in the point that the storage areas of the two buffers $23_1$, $23_2$ can be used efficiently.

Further, the algorithm of deriving an evaluation result regarding compressed data in the evaluating part 34 shown in FIG. 2 may be any algorithm as long as it evaluates the degree of appropriateness of respective compressed data as the result of fixed-length compression processing based on whether or not the size of compressed data is within a predetermined range including the target size, the degree of difference from the target size, and the like.

Second Embodiment

Figure 5:
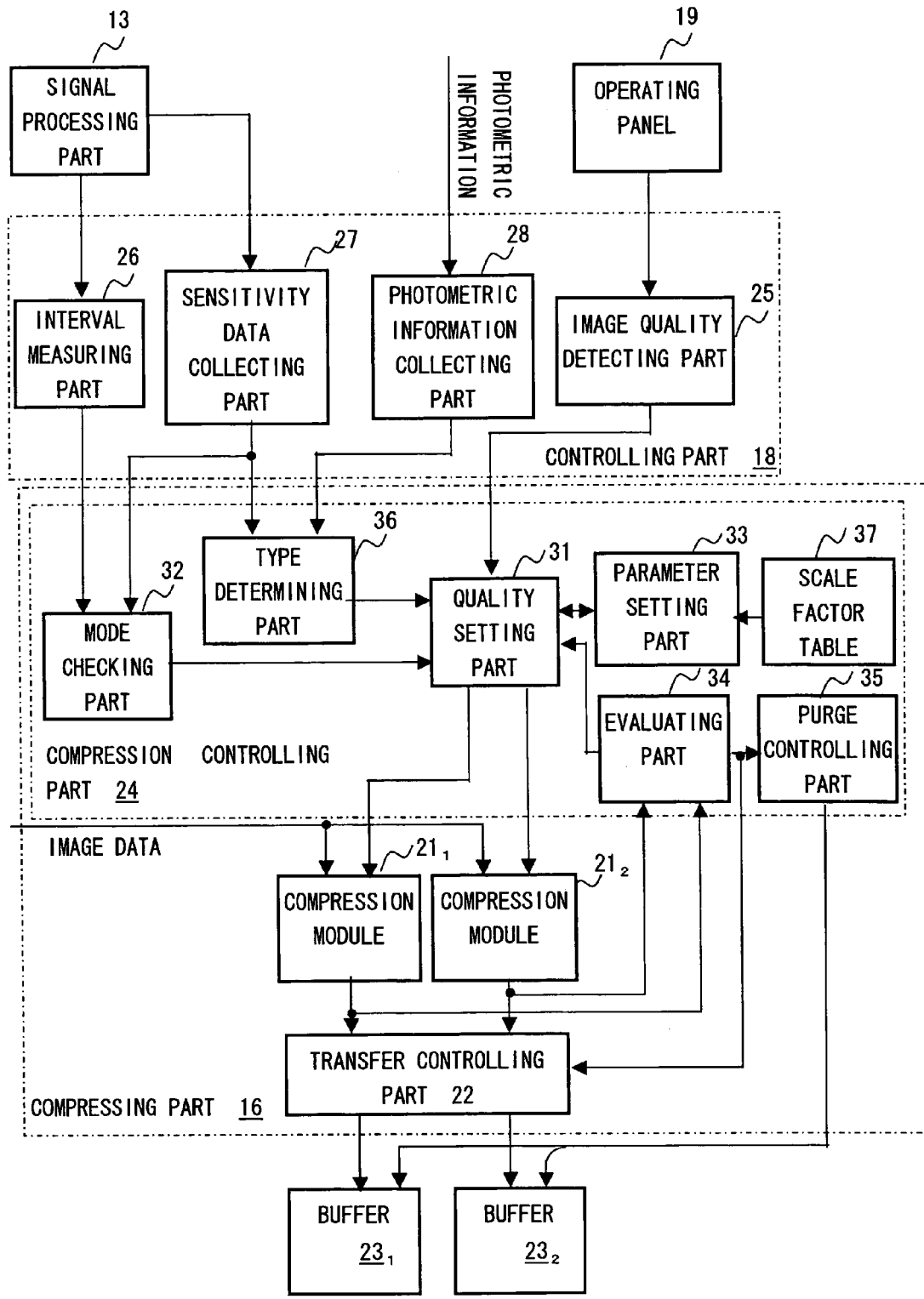
FIG. 5 is a view showing another structural example of an image data compressing part.

FIG. 5 shows another structural example of an image data compressing part according to the present invention.

In the controlling part 18 shown in FIG. 5, a photometric information collecting part 28 collects photometric information obtained by photometric processing part (not shown) provided in the digital still camera, and the photometric information is passed to a type determining part 36 provided in the compression controlling part 24.

To the type determining part 36, also sensitivity information collected by the above-described sensitivity data collecting part 27 is also inputted, and then the photometric information and the sensitivity information are used for processing of judging the type of a photographing target scene by the type determining part 36.

The type determining part 36 sets, for example, at least one appropriate threshold value in advance for each of an ISO value (ISO speed setting value) included in the sensitivity information, a difference in photometric values between photometric spots included in the photometric information, and the like. Based on a result of comparing the threshold values, the sensitivity information and the photometric information, the type determining part 36 categorizes target scenes into a standard image from which compressed data of a standard size is expectably generated using a standard scale factor, a complicated image having an amount of codes larger than the standard image, and a plain image having a small amount of codes. A result of this categorization is provided to the quality setting part 31 as a judgment result for the processing.

Note that the above-described threshold values regarding the differential values in photometric values and the ISO values (ISO speed setting values) can be appropriately set respectively based on knowledge accumulated about relationships between various photographing target scenes and sensitivity setting applied to respective scenes and/or photometric data obtained when photographing. It is known that quite high sensitivity setting of approximately ISO 800 for example is often applied for the complicated image with a large amount of codes, and generally the plain image is often obtained for a portrait photographing or a scenery photographing.

Further, from knowledge accumulated about relationships between various scale factors applied to image data obtained from various photographing target scenes and sizes of compressed data that can be obtained by compression applying these scale factors, it is possible to derive, for typical examples of the standard image, the complicated image and the plain image, reference values of scale factors to be applied for compressing the respective images to a target size and an upper limit value or a lower limit value of scale factors for compressing the respective images to a size within a tolerable range including this target size. For example, a reference value of a scale factor corresponding to the above-described standard image can be determined to be an appropriate value by way of repeating an experiment of compressing, using various scale factors, image data obtained by photographing various scenes for which it is expected that the standard scene setting is selected by the user, and deriving a relationship between compressed data and scale factors from experimental results thereof using a statistical method. Similarly, a reference value of a scale factor corresponding to the above-described complicated image can be determined to be an appropriate value by way of repeating an experiment of compressing, using various scale factors, various image data of photographing scenes from which image data having a large amount of information is obtained, such as a scene for which photographing with sensitivity setting of high ISO speed is appropriate, and deriving a relationship between compressed data and scale factors from experimental results thereof using a statistical method. Further, a reference value of a scale factor corresponding to the above-described plain image can be determined to be an appropriate value by way of repeating an experiment of compressing, using various scale factors, various image data of photographing scenes from which image data having a relatively small amount of information is obtained, such as a portrait, and deriving a relationship between compressed data and scale factors from experimental results thereof using a statistical method.

Figure 6:
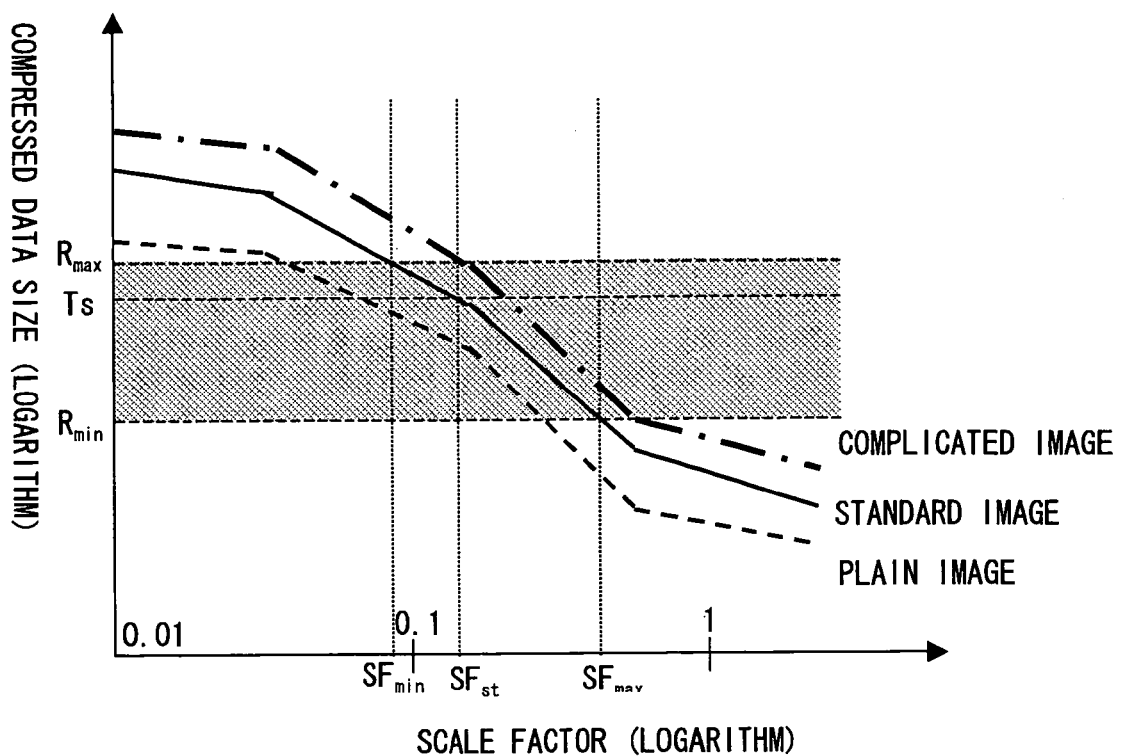
FIG. 6 is a view explaining a reference value for a scale factor.

The relationships of the scale factors and the sizes of compressed data obtained for the typical examples of the standard image, the complicated image and the plain image based on such experiments are shown in FIG. 6 by a solid line, a dotted and dashed line, and a dashed line, respectively.

In FIG. 6, the tolerable range of compressed data corresponding to the target size Ts shown by image quality setting (shown by adding reference symbols $R_{max}$, $R_{min}$ in FIG. 6) are shown as shaded areas, and the reference value $SF_{st}$, the upper limit value $SF_{max}$ and the lower limit value $SF_{min}$ for the scale factors are shown by intersections of graphs showing the relationships regarding the standard image and the target size Ts, the lower limit $R_{min}$ of the tolerable range and the upper limit $R_{max}$ of tolerable range, respectively. Similarly, reference values, upper limit values and lower limit values for the complicated image and the plain image can be derived respectively.

In this manner, the reference values, the upper limit values and the lower limit values for the scale factors obtained for each of the types of target scenes are stored in a scale factor table 37 shown in FIG. 5 and used for the determination processing of the scale factors by the parameter setting part 33, and thereby a judgment result for a photographed scene obtained by the type determining part 36 as described above can be reflected to values of the scale factors to be set to the compression modules $21_1$, $21_2$ by the quality setting part 31.

For example, upon reception of a judgment result via the quality setting part 31 indicating that the photographed scene is a standard image, the parameter setting part 33 may read out the reference value $SF_{st}$ and the upper limit value $SF_{max}$ corresponding to the standard image from the scale factor table 37 to return the reference value $SF_{st}$ and the upper limit value $SF_{max}$ as the SF1, SF2 corresponding to the compression modules $21_1$, $21_2$ respectively. Further, it is also possible to obtain the SF2 by multiplying the reference value $SF_{st}$ by a predetermined coefficient larger than a numeric value "1", and return the calculated SF2 to the quality setting part 31 instead of the upper limit value $SF_{max}$ as long as this value is equal to or lower than the upper limit value $SF_{max}$.

On the other hand, when the scene as the photographing target is a complicated image, the parameter setting part 33 may read out the reference value $SF_{st}$ and the lower limit value $SF_{min}$ corresponding to the complicated image from the scale factor table 37 and return the reference value $SF_{st}$ and the lower limit value $SF_{min}$ as the SF1, SF2 corresponding to the compression modules $21_1$, $21_2$, respectively. Further, when the imaged scene is a plain image, the parameter setting part 33 may read out the reference value $SF_{st}$ and the upper limit value $SF_{max}$ corresponding to the plain image from the scale factor table 37 and output the reference value $SF_{st}$ and the upper limit value $SF_{max}$ as the SF1, SF2 corresponding to the compression modules $21_1$, $21_2$, respectively.

In this manner, by switching values of the scale factors applied in the two compression modules $21_1$, $21_2$ according to a photographed scene, compressed data having a size within the tolerable range can be obtained with much higher probability, and therefore it is possible to improve the precision of the size of compressed data due to fixed-length compression while keeping the speed of compression processing.

As has been described above, the digital still camera according to the present invention significantly increases the speed of compression processing while allowing the size of a few compressed data to exceed the tolerance range, and thereby a fast operation needed during continuous shooting can be realized, regardless of increase in number of pixels of the image sensor. Further, during continuous shooting, a scale factor obtained by correcting a scale factor applied in a previous frame by reflecting a compression result in the previous frame can be applied for using similarity of continuously photographed image data so as to make sizes of compressed data converge to the target size with higher precision.

Furthermore, by devising the processing of storing compressed data obtained in parallel by the two compression modules, it becomes possible to efficiently use the storage area of a memory which temporarily retains compressed data. Such alleviation of processing load required for storage area management in a memory also contributes to the increase in speed of the compression processing of image data.

Accordingly, the performance of continuous shooting that has been said to be lower than that with a silver film camera can be improved greatly, thereby realizing fast, continuous shooting that can sufficiently respond to high-level demands from professional and/or semi-professional users.

In the digital still camera according to the present invention, dispersion in size of majority of compressed data is suppressed within the tolerable range, and dispersion in size that occurs in a few compressed data can be solved sufficiently by increase in number of recordable images along with massive increase in capacity of storage media. Therefore, it is obvious that merits brought about by the improve in continuous shooting performance obtained by the increase in speed of compression processing are larger than demerits of tolerating dispersion in compressed data size for a few photographed images.

Since such characteristics sufficiently respond to demands from general users to shoot images as a hobby as well as high-level demands from semi-professionals and/or professionals for shooting images in a professional manner, the present invention is quite useful not only for a compact camera type digital still camera but also for a high-grade type such as a single lens reflex digital still camera or a digital still camera for a specialized application such as high speed shooting.

The invention is not limited to the above embodiments and various modifications may be made without departing from the spirit and scope of the invention. Any improvement may be made in part of all of the components.

What is claimed is:

1. A digital still camera which compresses image data for recording, the image data representing a digital still image photographed by a photographing unit, the digital still camera comprising:
   a first compression unit which compresses inputted image data, using a predetermined first compression parameter;

a second compression unit which compresses said inputted image data, using a second compression parameter different from said first compression parameter;

an evaluating unit which evaluates compression results of said first compression unit and of said second compression unit based on a relationship between the compression results and a predetermined range including a target size of compressed data; and a selecting unit which selectively performs recording processing to a compression result highly evaluated by said evaluating unit, wherein:

said first compression unit performs compression processing to image data obtained by said photographing unit, using a standard compression parameter with which image data of a standard image with a standard amount of information is compressed to obtain compressed data of said target size; and said second compression unit performs compression to image data obtained by said photographing unit, using a compression parameter corresponding to a predetermined auxiliary scale factor, the auxiliary scale factor being equal to or larger than a standard scale factor corresponding to said standard compression parameter and smaller than a maximum scale factor which corresponds to a compression parameter with which said standard image is compressed to obtain compressed data of a size corresponding to a lower limit of a predetermined range including said target size.

2. A digital still camera which compresses image data for recording, the image data representing a digital still image photographed by a photographing unit, the digital still camera comprising:

a first compression unit which compresses inputted image data, using a predetermined first compression parameter;

a second compression unit which compresses said inputted image data, using a second compression parameter different from said first compression parameter;

an evaluating unit which evaluates compression results of said first compression unit and of said second compression unit based on a relationship between the compression results and a predetermined range including a target size of compressed data; and a selecting unit which selectively performs recording processing to a compression result highly evaluated by said evaluating unit, wherein:

said first compression unit performs compression processing to image data obtained by said photographing unit, using a plain compression parameter with which image data of a typical plain image with an amount of information smaller than the standard image is compressed to obtain compressed data of said target size; and said second compression unit performs compression to image data obtained by said photographing unit, using an upper limit compression parameter with which said typical plain image is compressed to obtain compressed data of a size corresponding to a lower limit of a predetermined range including said target size.

3. A digital still camera which compresses image data for recording, the image data representing a digital still image photographed by a photographing unit, the digital still camera comprising:

a first compression unit which compresses inputted image data, using a predetermined first compression parameter;

a second compression unit which compresses said inputted image data, using a second compression parameter different from said first compression parameter;

an evaluating unit which evaluates compression results of said first compression unit and of said second compression unit based on a relationship between the compression results and a predetermined range including a target size of compressed data; and a selecting unit which selectively performs recording processing to a compression result highly evaluated by said evaluating unit, wherein:

said first compression unit performs compression processing to image data obtained by said photographing unit, using a compression parameter for complicated images with which image data of a typical complicated image with an amount of information larger than the standard image is compressed to obtain compressed data of said target size; and said second compression unit performs compression to image data obtained by said photographing unit, using a lower limit compression parameter with which image data of said typical complicated image is compressed to obtain compressed data of a size corresponding to an upper limit of a predetermined range including said target size.

4. A digital still camera which compresses image data for recording, the image data representing a digital still image photographed by a photographing unit, the digital still camera comprising:

a first compression unit which compresses inputted image data, using a predetermined first compression parameter;

a second compression unit which compresses said inputted image data, using a second compression parameter different from said first compression parameter;

an evaluating unit which evaluates compression results of said first compression unit and of said second compression unit based on a relationship between the compression results and a predetermined range including a target size of compressed data;

a selecting unit which selectively performs recording processing to a compression result highly evaluated by said evaluating unit;

a parameter calculating unit which calculates, in response to a mode setting instruction, a first compression parameter to be used in said first compression unit for image data of a current frame, based on a compression parameter for compressed data of a previous frame selected by said selecting unit and on a size of the selected compressed data and said target size, and provides the first compression parameter to said first compression unit for the compression processing, the mode setting instruction indicating a continuous shooting mode in which images are shot continuously by said photographing unit; and a parameter determining unit which determines a value of a second compression parameter based on the first compression parameter calculated by said parameter calculating unit, and provides the second compression parameter to said second compression unit for the compression processing.

5. A digital still camera which compresses image data for recording, the image data representing a digital still image photographed by a photographing unit, the digital still camera comprising:

a first compression unit which compresses inputted image data, using a predetermined first compression parameter;

a second compression unit which compresses said inputted image data, using a second compression parameter different from said first compression parameter;

an evaluating unit which evaluates compression results of said first compression unit and of said second compression unit based on a relationship between the compression results and a predetermined range including a target size of compressed data; and a selecting unit which selectively performs recording processing to a compression result highly evaluated by said evaluating unit, wherein:

said selecting unit comprises:

two memories which store therein compressed data obtained by said first compression unit and said second compression unit, respectively;

a purging unit which purges compressed data evaluated low by said evaluating unit, out of two compressed data of an image of a current frame, the two compressed data being written in parallel to said two memories; and an assigning unit which assigns one of said memories storing the compressed data purged by said purging unit, as a storage of compressed data of a next frame to be generated by one of said first and second compression units which has generated compressed data of said current frame highly evaluated by said evaluating unit.

* * * * *